(12) United States Patent
Naumann et al.

(10) Patent No.: US 11,994,384 B2
(45) Date of Patent: May 28, 2024

(54) METHOD FOR RADIALLY ALIGNING WHEELSETS OF RAIL VEHICLES

(71) Applicant: HEGENSCHEIDT-MFD GMBH, Erkelenz (DE)

(72) Inventors: John Oliver Naumann, Wassenberg (DE); Sascha Tholen, Waldfeucht (DE); Karl Müller, Erkelenz (DE)

(73) Assignee: Hegenscheidt-MFD GmbH, Erkelenz (DE)

( * ) Notice: Subject to any disclaimer, the term of this patent is extended or adjusted under 35 U.S.C. 154(b) by 527 days.

(21) Appl. No.: 17/277,068

(22) PCT Filed: Oct. 11, 2019

(86) PCT No.: PCT/EP2019/077594
§ 371 (c)(1),
(2) Date: Mar. 17, 2021

(87) PCT Pub. No.: WO2020/074701
PCT Pub. Date: Apr. 16, 2020

(65) Prior Publication Data
US 2021/0372789 A1 Dec. 2, 2021

(30) Foreign Application Priority Data

Oct. 12, 2018 (EP) .................................. 18200207

(51) Int. Cl.
*G01B 21/24* (2006.01)
*B61K 9/12* (2006.01)
*G01M 17/10* (2006.01)

(52) U.S. Cl.
CPC ............... *G01B 21/24* (2013.01); *B61K 9/12* (2013.01); *G01M 17/10* (2013.01)

(58) Field of Classification Search
CPC .......... G01B 21/24; B61K 9/12; G01M 17/10
See application file for complete search history.

(56) References Cited

U.S. PATENT DOCUMENTS

| | | | |
|---|---|---|---|
| 6,894,771 B1 | 5/2005 | Dorrance et al. | |
| 2010/0256874 A1* | 10/2010 | Carresjo | B60C 23/0488 |
| | | | 701/48 |

(Continued)

FOREIGN PATENT DOCUMENTS

| | | |
|---|---|---|
| AU | 2015261670 B2 | 10/2016 |
| CN | 101479565 A | 7/2009 |

(Continued)

OTHER PUBLICATIONS

Lou, P. (2004). Constraint equations between the wheelset and rails on straight railway track. Proceedings of the Institution of Mechanical Engineers, Part F: Journal of Rail and Rapid Transit, 218(3), 255-263. (Year: 2004).*

(Continued)

*Primary Examiner* — Aniss Chad
*Assistant Examiner* — Stephanie T Su
(74) *Attorney, Agent, or Firm* — Harness, Dickey & Pierce, P.L.C.

(57) ABSTRACT

The disclosure relates to a method for radially aligning wheelsets of rail vehicles relative to a coordinate system of a wheelset diagnosis tool and/or wheelset machine tool, which method can be implemented quickly with sufficient precision and comprises the following steps: a) positioning the wheelset at a working position of the tool; b) defining a tool-side coordinate system in an assumed wheel centre point of each wheel, where an X-axis adopts a vertical extent, a Y-axis adopts a horizontal extent and a Z-axis describes the resulting depth extent of the wheel; c) measuring the distance of the wheel backs with respect to one another and defining the Z-position=0 on each wheel back; d) defining a unique Z-position for each measuring point; e) positioning each measuring sensor at the specified Z-position; f) measuring the X-position of each measuring point; g)

(Continued)

aligning the wheelset by vertically displacing one of the wheels in order to match the X-positions of the measuring points of two wheels.

5 Claims, 3 Drawing Sheets

(56) References Cited

U.S. PATENT DOCUMENTS

| | | | | |
|---|---|---|---|---|
| 2014/0326160 A1* | 11/2014 | Donhauser | ............. | A63G 21/10 |
| | | | | 104/53 |
| 2016/0018209 A1 | 1/2016 | Nagornov | | |
| 2017/0083020 A1* | 3/2017 | Purwin | ................ | G06Q 10/087 |
| 2017/0349003 A1* | 12/2017 | Joso | ....................... | B60G 13/04 |
| 2018/0057050 A1* | 3/2018 | Takenaka | ........... | B60G 17/0162 |

FOREIGN PATENT DOCUMENTS

| | | |
|---|---|---|
| CN | 106769116 A | 5/2017 |
| DE | 102013111526 A1 | 4/2015 |
| EP | 1614602 A1 | 1/2006 |
| EP | 2402227 A1 | 1/2012 |
| EP | 2866014 A1 | 4/2015 |
| JP | H1073408 A | 3/1998 |
| WO | WO-2006100170 A1 | 9/2006 |

OTHER PUBLICATIONS

Attivissimo F et al. "A Railway Measurement System to Evaluate the Wheel-Rail Interaction Quality", IEEE Transactions on Instrumentation and Measurement, IEEE Service Center, Piscataway, NJ, US, vol. 56, No. 5, Oct. 1, 2007 (Oct. 1, 2007), pp. 1583-1589, DOI: 10.1109/TIM.2007.903583, ISSN: 0018-9456, XP011192296, the whole document.

* cited by examiner

METHOD FOR RADIALLY ALIGNING WHEELSETS OF RAIL VEHICLES

CROSS-REFERENCE TO RELATED APPLICATIONS

This application is a U.S. National Phase Application under 35 U.S.C. 371 of International Application No. PCT/EP2019/077594, filed on Oct. 11, 2019, which claims the benefit of European Patent Application No. 18200207.1, filed on Oct. 12, 2018. The entire disclosures of the above applications are incorporated herein by reference.

FIELD

The present disclosure relates to a method for radially aligning wheelsets of rail vehicles relative to a coordinate system of a wheelset diagnosis tool and/or wheelset machine tool.

BACKGROUND

This section provides background information related to the present disclosure which is not necessarily prior art.

Such methods are required in the state of the art for analyzing or editing the wheelsets of rail vehicles.

The wheels of rail vehicles are subject to constant monitoring, editing, and post-processing. Included are processes like turning or rolling, as well as an analysis, for example for safety-related reasons.

The wheels of rail vehicles comprise tread areas and wheel flanges. They are subject to massive stresses. The rolling movements on rails result in circulations of the material and deformations, which have to be monitored regularly and if necessary reworked.

For this purpose it is known to position the wheelsets on machine tools, wherein every wheel is being supported, centered, and if possible driven.

Machine tools, in which the wheels are positioned above the machine tool, are known in the state of the art. They are so-called underfloor machine tools. The wheels can be situated on the wagon or train in the installed condition, for example connected by means of an axis in the extended version, or individually hung in case of bogies of a particular kind. In the last case, the wheels are aligned along a virtual shaft.

Since the intention of the analyses as well as the adaptions is to identify differences of the wheel contour from the targets and if necessary rectify them by means of adaptions, it is essential that the wheels have an exact initial position relative to the machine tool. Viz., the coordinate systems of the machine tool on the one hand and of the wheelset on the other hand have to be synchronized to one another.

The coordinate system of a machine tool is a three-dimensional coordinate system, wherein one direction is fixed by the longitudinal direction of the rails. A second coordinate, which is situated in the same plane, lies on a connecting line on the pair of rails. On the other hand, the third axis is vertical with respect to this plane.

The coordinate system of a wheelset is also three-dimensional, wherein one plane is defined by a two-dimensional coordinate system, which lies on the rear side of a wheel and which has its origin in the centre of the wheel. The third coordinate is perpendicular with respect to it and extends along the shaft or rather the virtual shaft.

If one then positions a wheelset on the rails of an analysis- or processing machine tool, there will be a difference between the two coordinate systems as a result of the wheel contour changed by the operation.

The aim is that the coordinate direction, which describes the depth extension of the wheel, and which thereby is perpendicular to the plane that is parallel to the back of the wheel, is parallel to the plane of the wheel processing machine tool, which is pre-determined by the longitudinal direction and transverse direction of the rail system. Furthermore, the plane, which is parallel to the back of the wheel of every wheel, shall be perpendicular to the plane of the rail system and is supposed to extend parallel to the rail's longitudinal direction.

As the wheels can also be relatively differently work-worn with respect to one another due to the operation, which certainly should be identified right now for the purpose of the processing, the deviations of the one wheel coordinate system can be identified after the orientation of the other wheel coordinate system with respect to the machine system and the analytical values or the processing values can be determined therefrom.

In the state of the art, one implemented a wheel diameter determination for the purpose of the orientation of wheelsets with respect to the corresponding machines. Based upon the wheel diameter, a plane results that lies at the upper vertex of the wheels, and which is parallel to the plane of the rail system. It then results from the diameter measurement which wheel has to be lifted for attaining the upper vertex level. On this side, the wheelset will be lifted by means of the corresponding roller system of the processing- or analysis machine tool.

In the state of the art, it has shown that firstly, this method is very vague, and secondly, it needs a very long period of time and a plurality of measurements to execute it precisely. However, the verification and, if necessary, the rework of wheelsets have to be able of being executed as quickly as possible. On the one hand, the corresponding analysis- and processing machine tools are very expensive, and on the other hand, the railway inventory is growing worldwide, such that the utilization of the analysis- and processing machine tools is very high.

SUMMARY

This section provides a general summary of the disclosure, and is not a comprehensive disclosure of its full scope or all of its features.

Based upon the above described state of the art, it is the object of the present disclosure to suggest a method for radially aligning wheelsets of rail vehicles relative to a coordinate system of a wheelset diagnosis tool and/or wheelset machine tool, which method can be implemented quickly with sufficient precision.

The disclosure presumes that one wheelset comprises two wheels, which are relatively arranged to one another with the wheel backs pointing to one another. Usually, they are placed on a common axis or shaft, or are hung separately, as it is state of the art of particular kinds of bogies, such that they are positioned with respect to each other on a virtual shaft.

In a first step, this wheelset will be positioned in a working position of the machine tool. Usually, it is a piece of a rail system with two rails, which run parallel to one another and are, regarding the height, aligned to one another.

Furthermore, a coordinate system is being established in a presumed centre of every wheel. The X-axis is arranged in a vertically extending manner from the centre of the wheel, and the Y-axis extends horizontally. The plane described thereby is located parallel to the back of the wheel. The Z-axis, which is perpendicular to the X-Y-system, describes the depth extension of the wheel. Herein, the respective zero value of both X-axes is referring to a machine axis. Thereby, both X0-points are horizontal in relation to the machine tool.

Afterwards, the measurement, which measures the distance of the wheel backs to one another, and thereby also the determination that the Z-position is zero at the respective back of every wheel, take place.

A definite Z-position for every measuring point is being determined and one measuring sensor each is being positioned at the given Z-position of every wheel. By measuring the X-position of the respectively defined measuring point, it can be determined whether the two wheels have the same radial alignment or not. Then, the wheels are being aligned to one another by moving one wheel vertically to compare the X-position of the measuring points of both wheels to one another.

In this manner, the radial alignment of wheelsets with respect to the respective machine tool can be performed very quickly.

According to one aspect of the disclosure, the Z-position can be defined via a measuring point in a measuring circle plane. This means that the Z-position defines a point on the profile. It is also possible to determine a vertex of a wheel flange dome as the Z-position. This is to some extend a specific measuring circle plane.

For vertically positioning one of the wheels, the wheel below can be lifted or the wheel, which is positioned higher, can be lowered, wherefore machine-side support rollers and the like can be used depending on the processing- and analysis machine tool.

With regard to FIGS. 6 and 7, the specific above-described procedure is being explained again in detail. Herein, FIG. 6 shows a rails system A in a stylized manner, FIG. 7 stylizes a wheel B in different positions.

It has already been explained that the coordinate system of a machine tool is a three-dimensional coordinate system, wherein one direction is being fixed by the longitudinal direction of the rails. A second coordinate, which is also located in the same plane, lies on a connecting line on the rail pair. In FIG. 6, these coordinates are a and b. They set up a plane. The coordinate c is shown as to be perpendicular with respect to it. Thereby, a machine-side coordinate system is being created.

A three-dimensional coordinate system is also shown for a wheelset, wherein one plane is being defined by a two-dimensional coordinate system. This is the plane at the back of the wheel, which has its origin in the centre of the wheel. These are the coordinates X and Y. The third coordinate is perpendicular to it and extends along the shaft or rather virtual shaft. These are the coordinates X, Y and Z according to FIG. 7. The figure in the middle indicates that the respective wheel has an extension of depth towards Z.

It was explained, that the respective zero-values of the X axes relate to a machine axis. Therefore, both origins of both coordinate systems of the two wheels are placed horizontally on an at least virtual axis. Consequentially, it is clear that this is a virtual reference.

According to the disclosure, a Z-position, in other words, a concrete depth value at the wheel, is being defined. Then it is being determined on both wheels, which X-value this Z-position has, in other words, at which X-value the same wheel contour with Z-extension can be detected. From the difference between these two X-values results how the real axis differs from the virtual axis, which refers to the machine axis. This difference, ΔX, then is the value by which the respective side has to be lifted or lowered.

According to an embodiment of the disclosure, the Y-value is being determined during the determination of the measuring point, either Y=0 or any desired Y-value, which for example determines a quadrant, such that the respective Z-position can be found in the same area at the respective other wheel.

The method described by the disclosure is sufficiently precise and in particular extremely quick to perform, wherein only a minimum of sensor technology and actuators are needed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

More advantages and characteristics of the disclosure become apparent from the following description with the aid of the figure. Herein:

Corresponding reference numerals indicate corresponding parts throughout the several views of the drawings.

DETAILED DESCRIPTION

Example embodiments will now be described more fully with reference to the accompanying drawings.

Figure 1:
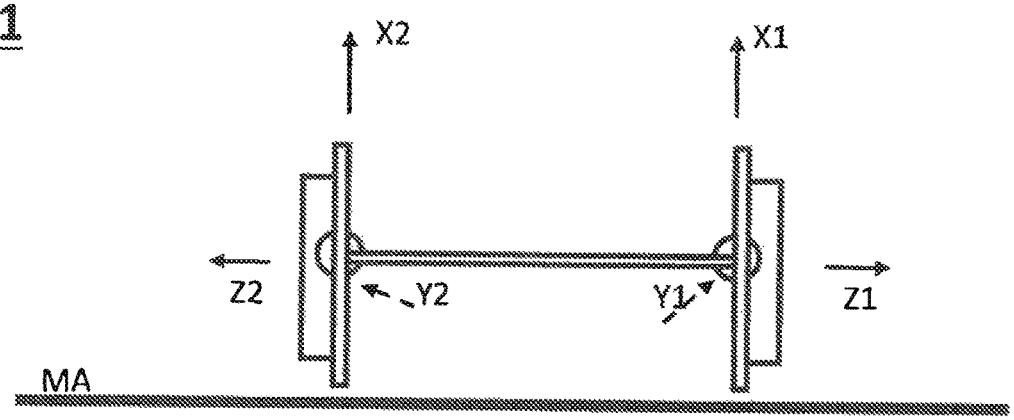
FIG. 1 shows a schematic representation of a wheelset for explaining the coordinate systems.

According to FIG. 1, a wheelset is shown in a purely stylized manner with a left and a right wheel, which are connected to each other through an axis. In each case, a coordinate system is arranged in the intersection point of the axis with the back of the wheel, whereby the Z1 and Z2-axes each define a horizontal direction, X1 and X2 a vertical direction and Y1 and Y2 define a direction which lies in the origin and is also horizontal. The respective zero-value of the Z-axes lies in the respective back of the wheel. The respective zero-value of the X-axes refers to a machine axis MA and lies in the area of the centre of the wheel. Due to the reference to the machine axis MA, both origins of both coordinate systems lie on a horizontal at least virtual axis. Due to the specification of the zero-value on the one hand and the specification of the X- and Z-axes on the other hand, the Y-axis is also unequivocally defined.

Figure 2:
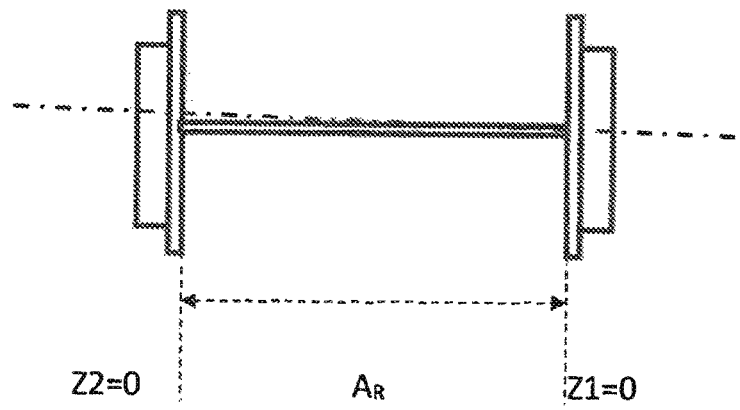
FIG. 2 shows a representation according to FIG. 1 for explaining the first step of the method according to the disclosure.

First of all, in a first step according to FIG. 2, the distance between the wheel backs to one another is being defined. In these positions Z1 as well as Z2 are zero.

Figure 3:
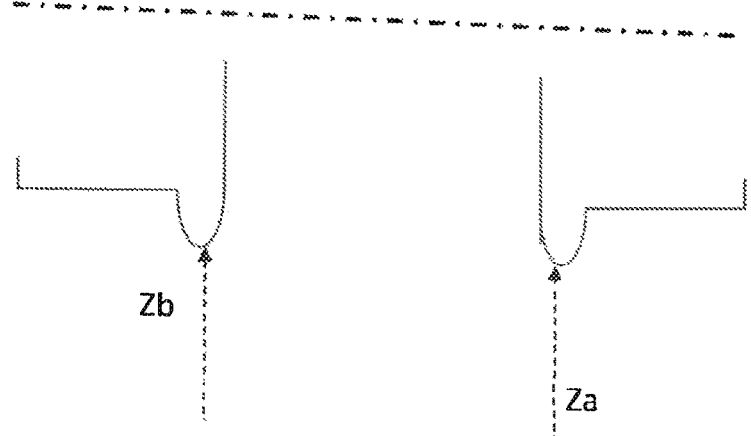
FIG. 3 shows a representation with enlarged wheel areas for explaining the next step of the method according to the disclosure.

According to FIG. 3, in the shown exemplary embodiment, a measuring point is then being defined on the respective wheel flange dome, wherein Za=Zb. This means that both measuring points lie in Z-direction of the respective coordinate system at the same Z-position, therefore Za lies along the Z1-axis at the same position as Zb along the Z2-axis.

Figure 4:
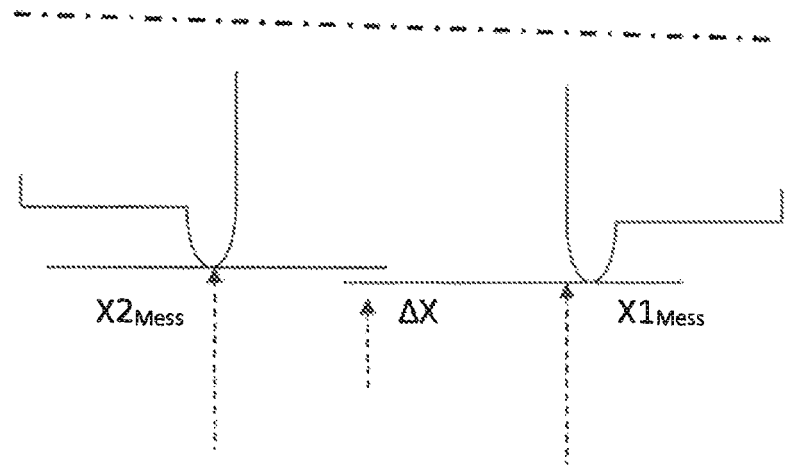
FIG. 4 shows a representation according to FIG. 3 for explaining the measuring procedure.

According to FIG. 4, for each of the two measuring points Za and Zb the X-value is then being measured. Therefore, X1 Mess and $X2_{Mess}$ are being defined. Then the difference between these two is a ΔX.

Figure 5:
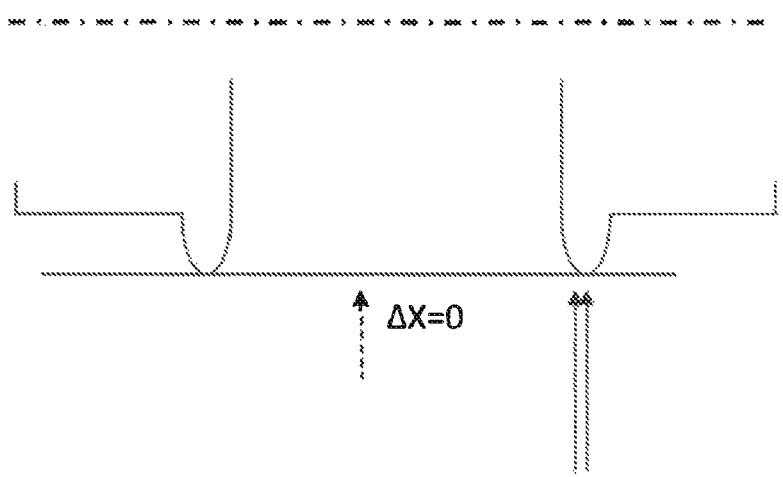
FIG. 5 shows a representation according to FIG. 3 for explaining the aligning procedure.
Figure 6:
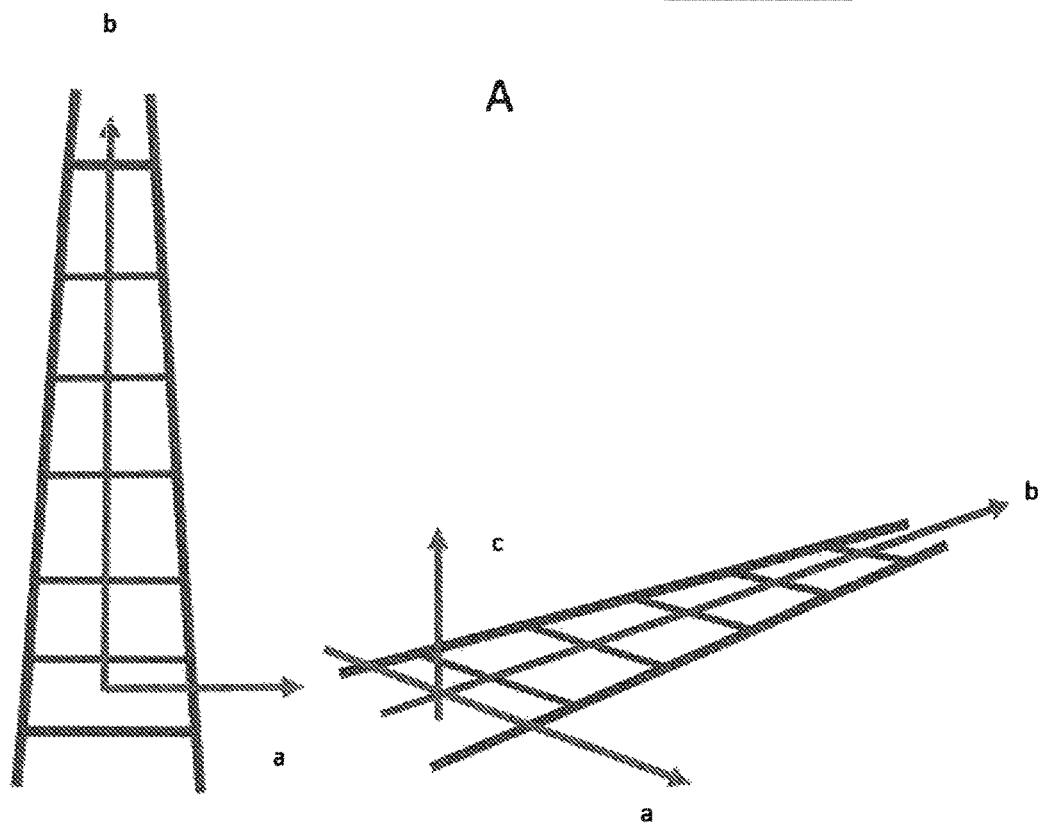
FIG. 6 shows a schematic representation of a rail system.
Figure 7:
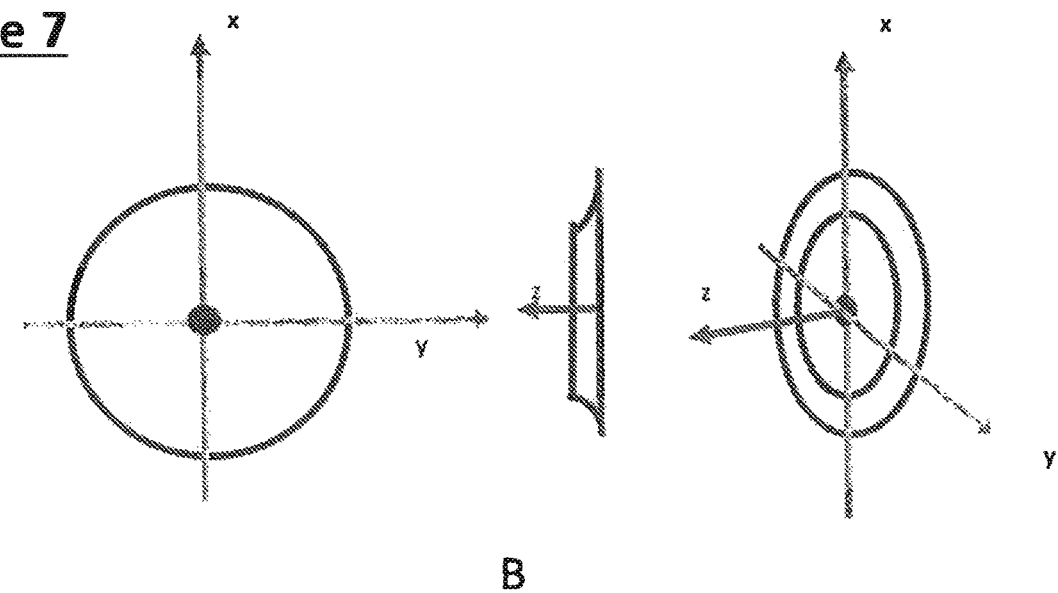
FIG. 7 shows a schematic representation of a wheel in different positions.

According to FIG. 5, the right wheel in the plane of the image is then exemplarily lifted in the X-direction, until the ΔX=0, so until both wheels of the wheelset are aligned.

The described exemplary embodiment only serves for explanation and is not limiting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for radially aligning wheelsets of rail vehicles relative to a coordinate system of a wheelset diagnosis tool and/or wheelset machine tool, wherein one wheelset comprises two wheels which are arranged on a common axis with their wheel backs pointing to one another, characterized by the following steps:

a) positioning of the wheelset at a working position of the tool;
b) defining a tool-side coordinate system in an assumed wheel centre point of each wheel, wherein an X-axis adopts a vertical extent, a Y-axis adopts a horizontal extent and a Z-axis describes the resulting depth extent of the wheel;
c) measuring the distance of the wheel backs with respect to one another and defining the Z-position=0 on the respective wheel back;
d) defining a unique Z-position for measuring points Za and Zb of the two wheels at a distance from the Z positions=0, whereby the measuring points Za and Zb are located at the same Z position of the coordinate systems of the two wheels and at respective zero points of the X axis relative to a machine axis as at least a virtual axis in the area of the wheel centre;
e) positioning one measuring sensor at the each specified Z-position of the measuring points Za and Zb;
f) measuring the X-positions for the Z-positions of the measuring points Za and Zb;
g) determining a difference ΔX from the X positions for the Z positions of the measuring points Za and Zb; and
h) aligning the wheelset by vertically displacing one of the wheels in order to align the X-positions of the measuring points Za and Zb of the two wheels, where ΔX=0.

2. The method according to claim 1, wherein the Z-position defines a measuring circle plane for a measuring point.

3. The method according to claim 1, wherein a vertex of a wheel flange dome is being defined as the Z-position.

4. The method according to claim 1, wherein the higher standing wheel is being lowered in order to synchronize the X-positions of the measuring points of both wheels.

5. The method according to claim 1, wherein the lower standing wheel is being lifted in order synchronize the X-positions of the measuring points of both wheels.

* * * * *